United States Patent
Ziv et al.

(10) Patent No.: US 8,756,574 B2
(45) Date of Patent: *Jun. 17, 2014

(54) USING REVERSE TIME FOR COVERAGE ANALYSIS

(75) Inventors: Avi Ziv, Haifa (IL); Laurent Fournier, Givat Ela (IL); Steven Mittermaier, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,798

(22) Filed: Sep. 12, 2012

(65) Prior Publication Data
US 2013/0007528 A1    Jan. 3, 2013

Related U.S. Application Data

(63) Continuation of application No. 12/731,170, filed on Mar. 25, 2010.

(51) Int. Cl.
*G06F 9/44* (2006.01)

(52) U.S. Cl.
USPC ........... 717/124; 717/125; 717/126; 717/127; 717/128; 717/129; 717/130; 717/131; 717/132; 717/133; 717/134; 717/135

(58) Field of Classification Search
None
See application file for complete search history.

(56) References Cited

U.S. PATENT DOCUMENTS

| | | | |
|---|---|---|---|
| 5,778,169 A * | 7/1998 | Reinhardt | 714/38.1 |
| 6,212,667 B1 * | 4/2001 | Geer et al. | 716/136 |
| 6,536,036 B1 * | 3/2003 | Pavela | 717/125 |
| 6,725,442 B1 * | 4/2004 | Cote et al. | 716/126 |
| 6,907,546 B1 * | 6/2005 | Haswell et al. | 714/38.11 |
| 6,993,470 B2 * | 1/2006 | Baumgartner et al. | 703/17 |
| 7,003,420 B2 * | 2/2006 | Ur et al. | 702/117 |
| 7,167,870 B2 * | 1/2007 | Avvari et al. | 717/124 |
| 7,181,376 B2 * | 2/2007 | Fine et al. | 703/2 |
| 7,389,215 B2 | 6/2008 | Azatchi et al. | |
| 7,392,507 B2 * | 6/2008 | Kolawa et al. | 717/124 |
| 7,428,715 B2 | 9/2008 | Fournier et al. | |
| 7,890,806 B2 * | 2/2011 | Kwong et al. | 717/124 |
| 7,949,901 B2 * | 5/2011 | Yano et al. | 714/33 |
| 7,958,400 B2 * | 6/2011 | Ur | 717/126 |
| 8,079,018 B2 * | 12/2011 | Huene et al. | 717/124 |
| 8,225,270 B2 * | 7/2012 | Frasher et al. | 717/101 |
| 2002/0019969 A1 * | 2/2002 | Hellestrand et al. | 716/5 |
| 2003/0061581 A1 * | 3/2003 | Baumgartner et al. | 716/4 |
| 2004/0064544 A1 * | 4/2004 | Barsness et al. | 709/224 |
| 2005/0114838 A1 * | 5/2005 | Stobie et al. | 717/124 |

(Continued)

OTHER PUBLICATIONS

"Test Coverage Analysis Based on Program Slicing" by Zhenqiang Chen, Baowen Xu, Hongji Yang, Huowang Chen, IEEE 2003.*

(Continued)

*Primary Examiner* — Henry Tsai
*Assistant Examiner* — Jing-Yih Shyu
(74) *Attorney, Agent, or Firm* — Ziv Glazberg

(57) ABSTRACT

Coverage analysis may be performed using reverse time. The coverage analysis may be based on last hit data. The last hit data may comprise a timestamp indicating a last time in which a coverage event was covered. Utilizing last hit data instead of first hit data as is known in the art enables distinction between coverage goals that were never covered and coverage goals that were not covered lately.

9 Claims, 4 Drawing Sheets

(56) References Cited

U.S. PATENT DOCUMENTS

| | | | |
|---|---|---|---|
| 2006/0101419 A1* | 5/2006 | Babcock | 717/130 |
| 2006/0129992 A1* | 6/2006 | Oberholtzer et al. | 717/124 |
| 2007/0234300 A1* | 10/2007 | Leake et al. | 717/124 |
| 2008/0256393 A1* | 10/2008 | Ur | 714/38 |
| 2008/0307263 A1* | 12/2008 | Coulter et al. | 714/37 |
| 2009/0287729 A1* | 11/2009 | Chen et al. | 707/102 |
| 2009/0313607 A1* | 12/2009 | Harding et al. | 717/125 |
| 2010/0017427 A1* | 1/2010 | Johnson et al. | 707/102 |
| 2010/0058295 A1* | 3/2010 | Johnson et al. | 717/124 |

OTHER PUBLICATIONS

"Using Coverage Information to Predict the Cost-Effectiveness of Regression Testing Strategies" by David S. Rosenblum and Elaine J. Weyuker, IEEE 1997.*

"Assembly instruction level reverse execution for debugging" byTankut Akgul and Vincent J. Mooney III, ACM Transactions on Software Engineering and Methodology, vol. 13, No. 2, Apr. 2004, pp. 149-198.*

H. Azatchi et al, "Advanced Analysis Techniques for Cross-Product Coverage", IEEE Trans. on Computers, vol. 55, No. 11, pp. 1367-1379, Nov. 2006.

* cited by examiner

USING REVERSE TIME FOR COVERAGE ANALYSIS

CROSS-REFERENCE TO RELATED APPLICATION

This application is a continuation application of U.S. patent application Ser. No. 12/731,170 entitled, "USING REVERSE TIME COVERAGE ANALYSIS", filed on Mar. 25, 2010 and is assigned to the same assignee in the present application, contents of which are incorporated by reference herein in its entirety. The present disclosure relates to verification of computerized devices, in general, and to coverage analysis of the verification process, in particular.

BACKGROUND

One technical problem dealt with by the disclosed subject matter is to provide coverage analysis. The coverage analysis may provide information enabling a verification engineer or another QA personnel to determine a verification strategy, such as to re-execute a test, to design a new test or the like.

One technical effect of utilizing the disclosed subject matter is to enable a verification engineer to distinguish between coverage events that were not covered at all and coverage events that were not covered lately. This distinction may be utilized to determine whether a test may be re-executed to cover the coverage event or whether a new test should be design to cover the coverage event. In some exemplary embodiments, re-execution may not achieve coverage as the design may have changed. The disclosed subject matter may enable the verification engineer to identify, based on the aforementioned distinction, a modification made to the DUV that was not handled correctly, such as by modifying pertinent tests, coverage goals or the like. The modification to the DUV may be a modification in the design itself, the environments or the tests. Another technical effect of utilizing the disclosed subject matter is to overcome drawbacks associated with prior art sliding window reports. As opposed to a sliding window report which requires a priori determination of a size of the window, the disclosed subject matter does not require such determination. Determining the "correct" size of the window is a difficult problem. The size of the window may depend on the size and difficulty of the coverage model, the availability of resources, rate of changes to the design, etc.

In some exemplary embodiments, the coverage analysis tool 200 may comprise a coverage status module 210. The coverage status module 210 may be configured to determine the coverage status and provide a report, or another indication thereof.

In some exemplary embodiments, the coverage analysis tool 200 may comprise a window selector 220. The window selector 220 may determine a sliding window based on the report provided by the coverage status module 210. The window selector 220 may utilize a begin time determinator 225 to determine a beginning time of the sliding window based on the report. The beginning time may be, for example, the time in which a predetermined percentage of the coverage tasks were covered, the time in which a predetermined number of coverage tasks were covered, or the like.

BRIEF SUMMARY OF THE INVENTION

In some exemplary embodiments, the coverage analysis tool 200 may comprise an Input/Output (I/O) module 205. The I/O module 205 may comprise a receiver (not shown) utilized to receive, retrieve or otherwise obtain a coverage events information from the coverage events repository 208. The I/O module 205 may be utilized to provide an output to a user, such as verification engineer 130 of FIG. 1. The I/O module 205 may output information to a display 207, a file, a printout, a hardcopy report or the like.

In some exemplary embodiments, a coverage analysis tool, such as 110 of FIG. 1, may utilize the table 500, or a similar indication, to determine which test to re-execute. For example, the table 500 may show that "coverage event 2" was not covered after Dec. 16, 2008 and its coverage is therefore out-dated. A test that is likely to cover the coverage event 2 may be executed by a verification tool, such as 140 of FIG. 1. The test may be, for example, a test that covered the coverage event in the past.

Yet another exemplary embodiment of the disclosed subject matter is a computer program product comprising: a computer readable medium; a first program instruction for receiving coverage events from a coverage events repository, each of the coverage events comprising a first timestamp, wherein the first timestamp indicates a last time in which the coverage event was covered; a second program instruction for determining an indication of a portion of the coverage events that was not covered recently, wherein the indication is based on the coverage events; a third program instruction for outputting the indication; and wherein said first, second and third program instructions are stored on said computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
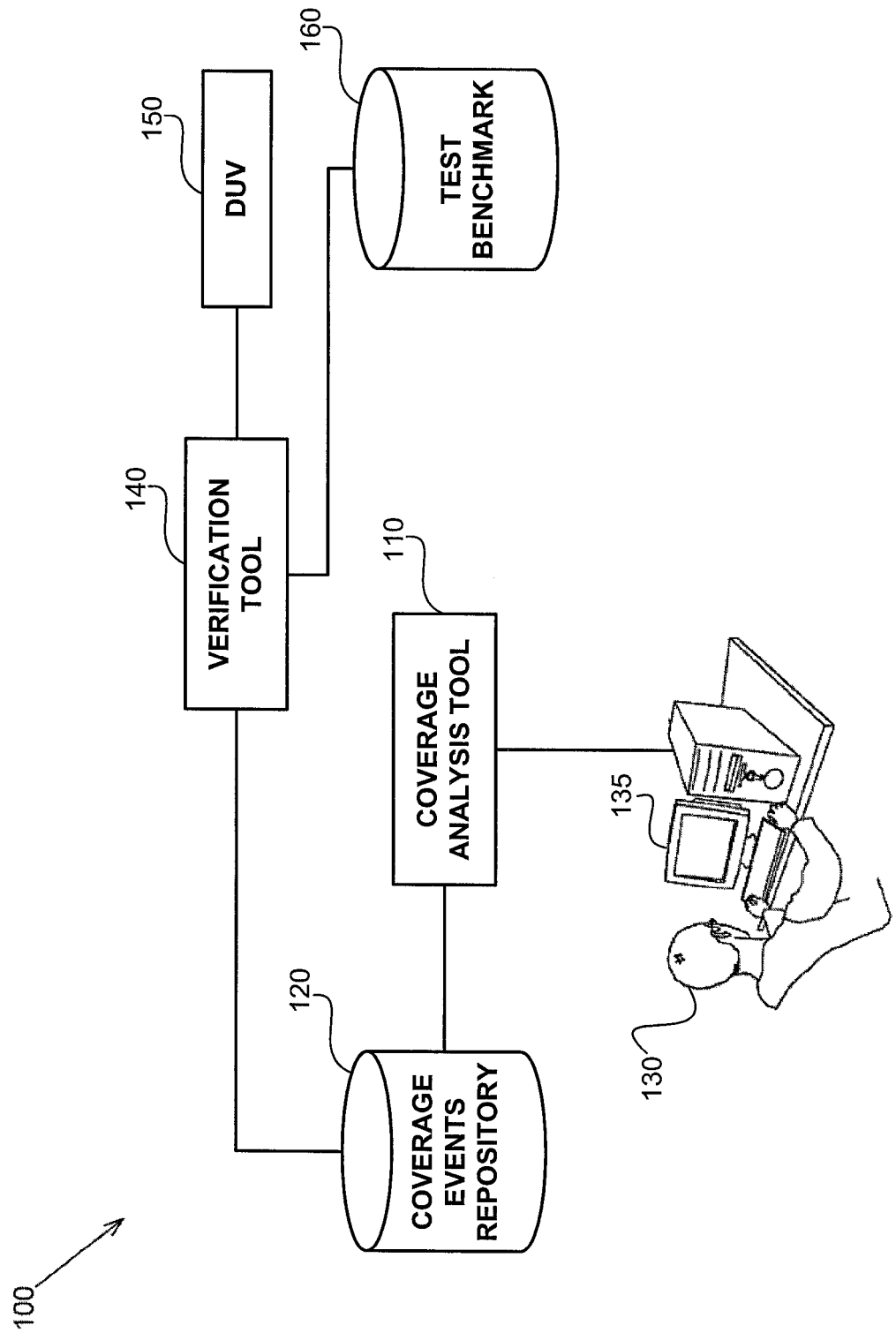
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide coverage analysis. The coverage analysis may provide information enabling a verification engineer or another QA personnel to determine a verification strategy, such as to re-execute a test, to design a new test or the like.

One technical solution is to provide coverage analysis based on last hit data. The last hit data comprises a timestamp indicating a last time in which a coverage event was covered. As opposed to prior art coverage analysis techniques which utilize a first hit data indicating a time in which the coverage event was covered first, a last hit data enables the verification engineer to determine whether a coverage event that was covered should be covered again. Based on last hit data, a sliding window may be selected, and a coverage analysis report based on the sliding window may be provided.

One technical effect of utilizing the disclosed subject matter is to enable a verification engineer to distinguish between coverage events that were not covered at all and coverage events that were not covered lately. This distinction may be utilized to determine whether a test may be re-executed to cover the coverage event or whether a new test should be design to cover the coverage event. In some exemplary embodiments, re-execution may not achieve coverage as the design may have changed. The disclosed subject matter may enable the verification engineer to identify, based on the aforementioned distinction, a modification made to the DUV that was not handled correctly, such as by modifying pertinent tests, coverage goals or the like. The modification to the DUV may be a modification in the design itself, the environments or the tests. Another technical effect of utilizing the disclosed subject matter is to overcome drawbacks associated with prior art sliding window reports. As opposed to a sliding window report which requires a-priori determination of a size of the window, the disclosed subject matter does not require such determination. Determining the "correct" size of the window is a difficult problem. The size of the window may depend on the size and difficulty of the coverage model, the availability of resources, rate of changes to the design, etc.

Referring now to FIG. 1 showing a computerized environment in which the disclosed subject matter is used, in accordance with some exemplary embodiments of the subject matter.

In some exemplary embodiments of the disclosed subject matter, a coverage analysis tool 110 may provide a coverage analysis information based on coverage events stored in a coverage events repository 120. The coverage events repository 120 may be a database, a storage system or the like. The coverage events repository 120 may comprise coverage events covered during the verification phase, since a last reset of the coverage events repository 120, or the like, In some exemplary embodiments, a verification engineer 130 may utilize a terminal 135 or a similar Man-Machine Interface to view information provided by the coverage analysis tool 110. The information may be displayed in a hard copy format, a soft copy format or the like.

In some exemplary embodiments, a verification tool 140 exercises a DUV 150, by performing tests on the DUV 150. The tests may be stored in a test benchmark 160 as is known in the art. The verification tool 140 may execute a test a predetermined number of times, during a predetermined timeframe, or the like. During the execution of a test, the verification tool 140 may report coverage of coverage events. The verification tool 140 may update the coverage events repository 120. In some exemplary embodiments, another module may determine coverage, such as for example, based on log files created during execution, based on data or the like.

The disclosed subject matter may be utilized using different coverage metrics such as but not limited to: code coverage, data coverage, functional coverage or the like.

Figure 2:
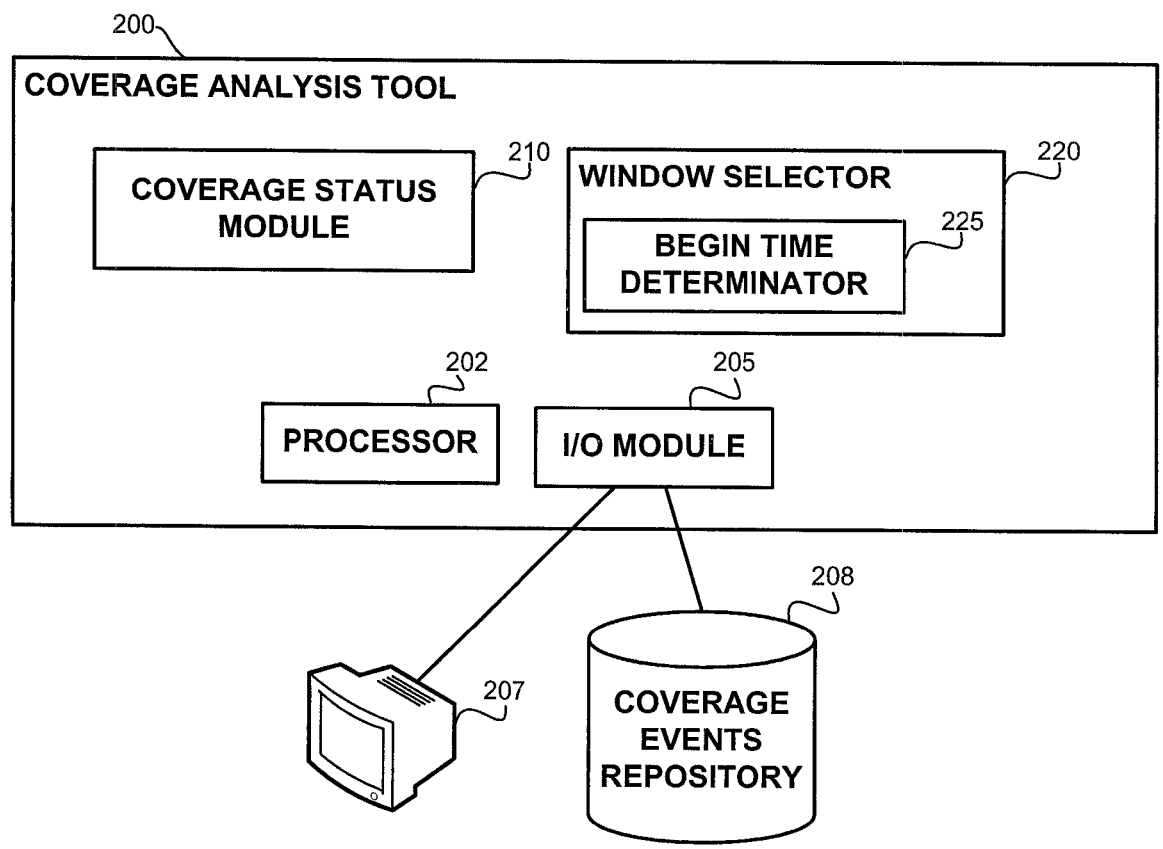
FIG. 2 shows a block diagram of a coverage analysis tool, in accordance with some exemplary embodiments of the disclosed subject matter.

Referring now to FIG. 2 showing a block diagram of a coverage analysis tool, in accordance with some exemplary embodiments of the disclosed subject matter. A coverage analysis tool 200, such as 110 of FIG. 1, may be configured to determine coverage analysis. The coverage analysis may be performed based on coverage events stored in a coverage events repository 208, such as 120 of FIG. 1.

In some exemplary embodiments, the coverage analysis tool 200 may determine the coverage analysis based on reverse time. E.g., instead of inspecting the coverage from the beginning of the verification phase (or last reset) onwards to current time, the coverage may be inspected in a manner that reverses the time: starting from the current time and ending in the beginning of the verification phase (or last reset). The coverage analysis may take into account all information about coverage events, and may avoid selecting a sliding window on which to focus. The coverage analysis tool 200 may provide a report similar to that known in the art, such as providing progress or status report. The report may comprise information such as a portion of the coverage events that were not covered since a predetermined time. The portion of the coverage events may be an absolute number, a percentage of the covered coverage events, a percentage of all coverage events or the like.

In some exemplary embodiments, the coverage analysis tool 200 may comprise a coverage status module 210. The coverage status module 210 may be configured to determine the coverage status and provide a report, or another indication thereof.

In some exemplary embodiments, the coverage analysis tool 200 may comprise a window selector 220. The window selector 220 may determine a sliding window based on the report provided by the coverage status module 210. The window selector 220 may utilize a begin time determinator 225 to determine a beginning time of the sliding window based on the report. The beginning time may be, for example, the time in which a predetermined percentage of the coverage tasks were covered, the time in which a predetermined number of coverage tasks were covered, or the like.

In some exemplary embodiments, the coverage analysis tool 200 may comprise an Input/Output (I/O) module 205. The I/O module 205 may comprise a receiver (not shown)

utilized to receive, retrieve or otherwise obtain a coverage events information from the coverage events repository 208. The I/O module 205 may be utilized to provide an output to a user, such as verification engineer 130 of FIG. 1. The I/O module 205 may output information to a display 207, a file, a printout, a hardcopy report or the like.

In some exemplary embodiments, the coverage analysis tool 200 may comprise a processor 202. The processor 202 may be a Central Processing Unit (CPU), a microprocessor, an electronic circuit, an Integrated Circuit (IC) or the like. The processor 202 may be utilized to perform computations required by the coverage analysis tool 200 or any of it subcomponents.

Figure 3:
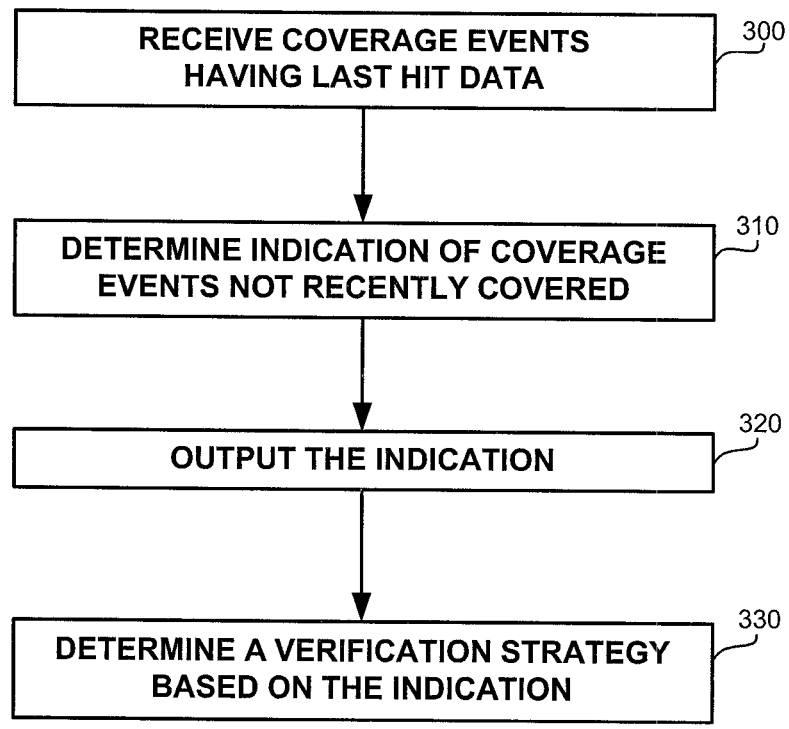
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 300, coverage events may be received. The coverage events may each comprise information regarding at least a last hit time. A coverage event may further comprise a first hit time, an identifier, an indication which test covered the coverage event or the like. The coverage events may be received using an I/O module, such as 205 of FIG. 2.

In step 310, an indication of coverage events not recently covered may be determined The indication may exclude coverage events never covered from coverage events that were covered but not recently covered. The indication may be determined by a coverage status module, such as 210 of FIG. 2. In some cases, the indication is a report, in accordance with the disclosed subject matter.

In step 320, the indication may be outputted. An I/O module, such as 205 may output the indication.

In step 330, a verification strategy may be determined based on the indication. The verification strategy may be determined automatically by a computerized apparatus, such as coverage analysis tool 200 of FIG. 2, or manually by a verification engineer. The verification strategy may provide a process that is likely to improve the coverage, such as for example by trying to cover an uncovered or recently uncovered coverage event. In some cases, the verification strategy may include executing a test that is likely to cover the coverage event, such as for example a test that in the past covered the coverage event. The verification strategy may include designing a new test to cover the coverage task.

In some exemplary embodiments, the verification strategy determined in step 330 may be performed either manually or automatically.

Figure 4:
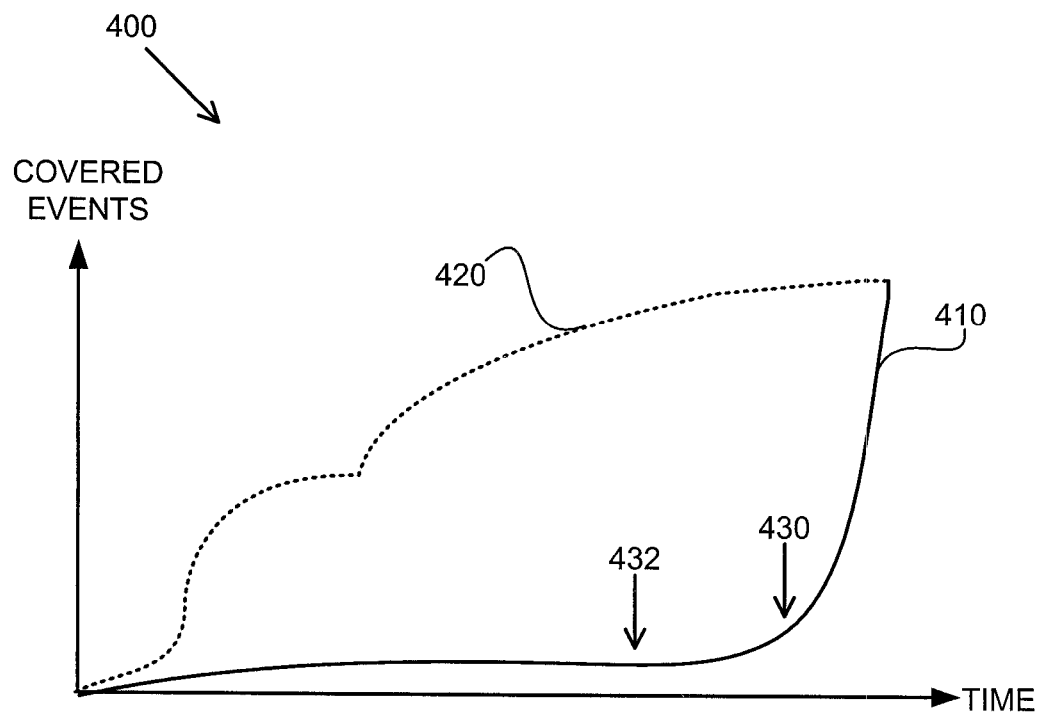
FIG. 4 shows an indication provided by the disclosed subject matter, in accordance with some exemplary embodiments of the disclosed subject matter.

Referring now to FIG. 4 showing an indication provided by the disclosed subject matter, in accordance with some exemplary embodiments of the disclosed subject matter. A graph 400 shows number of covered events over time during the verification phase. A curve 420 shows a number of covered events that were covered until a corresponding time. The curve 420 is similar to that already known in the art. A curve 410 shows a reverse time indication. The curve 410 shows a number of covered events that were covered after the corresponding time.

Using curve 410 information that is useful to the verification engineer may be derived. For example, coverage events represented in the curve 410 after point 430 may be deemed "easy to cover", whereas coverage events represents in the curve 410 before point 430 may be relatively harder to cover. Separation of the "hard" coverage events into "moderate" and "very hard" may be achieved based on a second point 432. The disclosed subject matter may provide a report that in addition to the graph 400 or instead of the graph 400 shows the coverage events that are associated with each such group. The points 430, 432 may be determined based on the curve 410, such as by including a predetermined percentage of the covered events, a predetermined number or the like.

Figure 5:
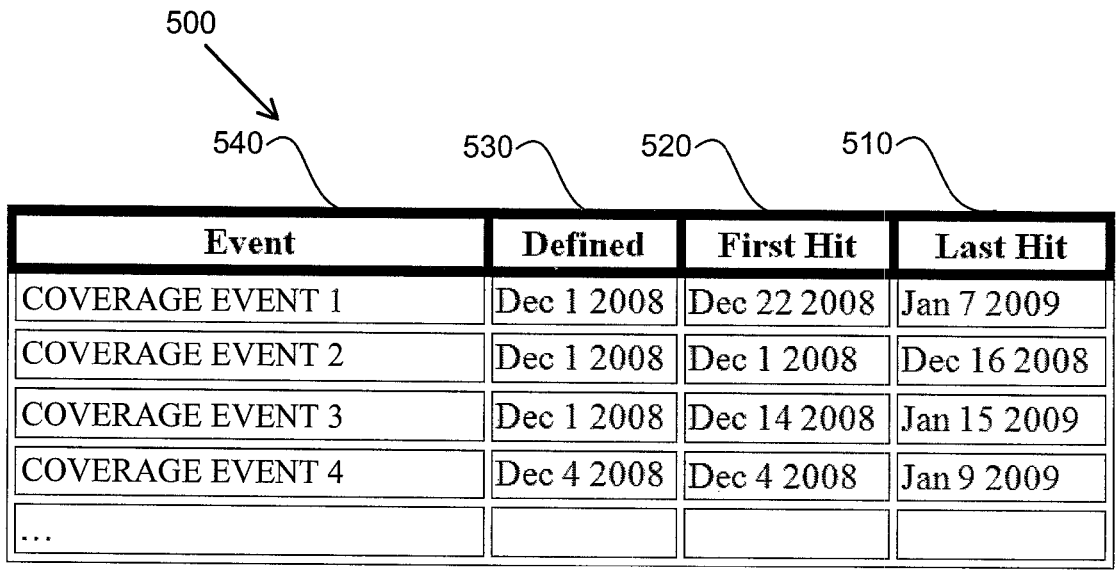
FIG. 5 shows an indication provided by the disclosed subject matter, in accordance with some exemplary embodiments of the disclosed subject matter.

Referring now to FIG. 5 showing an indication provided by the disclosed subject matter, in accordance with some exemplary embodiments of the disclosed subject matter. A table 500 may list coverage events associated with a DUV, such as 150 of FIG. 1. The table 500 may provide information associated with each coverage event, such as last hit time 510, first hit time 520, time of definition 530 and identification of event 540. The table 500 may further comprise an indication of a type of coverage, such as for example, never covered, out dated coverage or recently covered. In some cases, the indication may be a continuous value, such as ranging from zero (representing never covered) to one (representing covered in practically a moment ago). In some cases, the indication may be provided by showing different colors for each coverage event based on the continuous value. In some cases the table 500 may be provided based on a group of coverage events, such as not covered in the last thirty days, not covered in the last ten thousand executions or the like.

In some exemplary embodiments, a coverage analysis tool, such as 110 of FIG. 1, may utilize the table 500, or a similar indication, to determine which test to re-execute. For example, the table 500 may show that "coverage event 2" was not covered after Dec. 16, 2008 and its coverage is therefore out-dated. A test that is likely to cover the coverage event 2 may be executed by a verification tool, such as 140 of FIG. 1. The test may be, for example, a test that covered the coverage event in the past.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining coverage events, each of the coverage events comprising a timestamp, wherein the timestamp indicates a last time in which the coverage event was covered, whereby if the coverage event was covered a plurality of times, the timestamp indicates a most recent time out of the plurality of times;
    generating a reverse time report that provides an indication of change in coverage over time in accordance with a reverse order of the time, wherein the reverse time report is generated based on the timestamps,
    whereby the reverse time report indicates a coverage event as not covered before a second time, wherein a first time precedes the second time, and wherein the coverage event was covered at the first time and at the second time;
    outputting the reverse time report; and
        selecting a window, wherein the window comprises a begin time determinator configured to determine a time, the time is determined such that a predetermined portion of the plurality of coverage events were last covered after the time; and wherein the window selector is configured to provide a sliding window report starting from the time.

2. The method of claim 1 further comprises determining a verification strategy based on the indication.

3. The method of claim 2, wherein the verification strategy is selected from a group consisting of: re-executing a test and designing a new test.

4. The method of claim 1, wherein said outputting the reverse time report comprises displaying the list of the coverage events.

5. The method of claim 1,
    wherein said generating the reverse time report comprises:
        grouping the coverage events into groups based on the timestamps covered, wherein each group consists of coverage events having a timestamp within a predetermined range; and
    wherein said outputting comprises displaying the groups.

6. The method of claim 1, wherein the reverse time report comprises a curve indicating the change in coverage over time in accordance with a reverse order of the time.

7. The method of claim 6, wherein the curve indicates for each point in time, a number of coverage events that were covered after the point in time.

8. The method of claim 6,
    wherein each coverage event further comprises a second timestamp indicating a first time in which the coverage event was covered; and
    wherein the reverse time report further comprises a second curve indicating the change in coverage over time as indicated by the second timestamps.

9. The method of claim 8, wherein said outputting comprises displaying the curve and the second curve using a shared axis representing the time.

* * * * *